United States Patent
Anpo et al.

[11] Patent Number: 6,077,492
[45] Date of Patent: Jun. 20, 2000

[54] PHOTOCATALYST, PROCESS FOR PRODUCING THE PHOTOCATALYST, AND PHOTOCATALYTIC REACTION METHOD

[75] Inventors: Masakazu Anpo; Hiromi Yamashita, both of Osaka; Sakunobu Kanai, Ibaraki; Kazuhito Sato, Saitama; Takanori Fujimoto, Ibaraki, all of Japan

[73] Assignee: Petroleum Energy Center, Tokyo, Japan

[21] Appl. No.: 08/894,552

[22] PCT Filed: Jan. 22, 1997

[86] PCT No.: PCT/JP97/00135

§ 371 Date: Aug. 21, 1997

§ 102(e) Date: Aug. 21, 1997

[87] PCT Pub. No.: WO97/26991

PCT Pub. Date: Jul. 31, 1997

[30] Foreign Application Priority Data

Jan. 22, 1996 [JP] Japan .................................. 8-026213
Nov. 8, 1996 [JP] Japan .................................. 8-311176

[51] Int. Cl.[7] .............................. B01J 8/00; B01J 37/34; B01J 23/00; B01D 53/00; C23C 14/00; C23C 14/08; C23C 14/06; C07C 5/23
[52] U.S. Cl. .................................... 423/239.1; 204/157.3; 427/523; 427/529; 427/530; 502/5; 502/349; 502/350; 585/377
[58] Field of Search .................................. 502/5, 349, 350; 204/157.3; 585/377; 427/523, 529, 530; 423/239.1; 315/111.81

[56] References Cited

U.S. PATENT DOCUMENTS 4,391,901  7/1983  Land et al. ............................... 430/495
5,759,948  6/1998  Takaoka et al. ........................ 502/325

FOREIGN PATENT DOCUMENTS 0 633 064   1/1995  European Pat. Off. .
6-39285     2/1994  Japan ................................ B01J 23/89
7-303835   11/1995  Japan ................................ B01J 23/745

OTHER PUBLICATIONS

International Search Report from the Japanese Patent Office dated Apr. 2, 1997.
Anpo et al.: "Photocatalysis on Ti–Al Binary Metal Oxides", J. Phys. Chem., vol. 92, 1988, pp. 438–440, XP002098080.
Kodama; Yagi: "Reaction Mechanisms for the Photocatalytic Isomerization and Hydrogenation of cis–2–butene over TiO2", J. Phys. Chem., vol. 93, No. 11, Jun. 1, 1989, pp. 4556–4561, XP002098081.

*Primary Examiner*—Steven P. Griffin
*Assistant Examiner*—Maribel Medina
*Attorney, Agent, or Firm*—Sughrue, Mion, Zinn, Macpeak & Seas, PLLC

[57] ABSTRACT

A titanium oxide photocatalyst having metal ions of one or more metals incorporated therein selected from the group consisting of Cr, V, Cu, Fe, Mg, Ag, Pd, Ni, Mn and Pt, wherein the metal ions are implanted from the surface to deep inside of the bulk of the photocatalyst in an amount of at least $1 \times 10^{15}$ ions per g of the titanium oxide; a process for producing the photocatalyst; and a photocatalytic reaction method using the photocatalyst.

18 Claims, 6 Drawing Sheets

PHOTOCATALYST, PROCESS FOR PRODUCING THE PHOTOCATALYST, AND PHOTOCATALYTIC REACTION METHOD

This application is the national stage of PCT/JP97/00135 filed on Jan. 22, 1997.

TECHNICAL FIELD

The present invention pertains to photocatalysts which can exhibit catalytic activity even upon irradiation with visible light, a process for producing the photocatalysts, and photocatalytic reactions methods, e.g., the decomposition reaction of nitrogen oxides and the isomerization reaction of butenes under light in the wavelength regions of not only ultraviolet but also visible. Specifically, the photocatalysts comprise titanium oxide catalysts into which specific metal ions are incorporated by an ion implantation method, i.e., the implantation of the titanium oxide catalysts with metal ions accelerated by high voltage.

BACKGROUND ART

Photocatalytic reactions using the titanium oxide catalyst have been the focus of our research as an environmentally-friendly and safe means of converting light energy into useful chemical energy at ordinary temperatures without generating any pollutants. Investigations into the application of such photocatalysts for reactions that can decontaminate and detoxify the environment have been one of the most significant objectives. In particular, investigations into particle size reduction to form ultrafine particles as well as the addition of metals such as Pt, Ag, or Ni into the titanium oxide catalyst have enhanced the efficiency of the reactions. Furthermore, parallel investigations on the adsorption of a dye onto titanium oxide catalysts have been carried out to explore the possibility of the use of visible light (about 400 nm–800 nm).

However, until now, photocatalytic reactions in prior art photocatalysts could proceed only when the reaction systems were irradiated with ultraviolet-light in wavelength regions shorter than about 380 nm, but could not proceed constantly in the visible region having long wavelengths. Examples of photocatalytic reactions using prior art titanium oxide photocatalysts include a decomposition reaction of nitrogen oxides and an isomerization reaction of butenes. However, these photocatalytic reactions proceed efficiently only when the reaction systems are irradiated with ultraviolet light.

Titanium oxide catalysts do not allow for the use of visible light and make use of only about 5% of solar beams that reach the earth, necessitating the use of an ultraviolet light source such as a mercury lamp.

DISCLOSURE OF THE INVENTION

An objective of the present invention is to provide titanium oxide photocatalysts that have been modified, to thereby shift their photoabsorption bands from ultraviolet to visible light regions, hence enabling them to operate efficiently as photocatalysts even under visible light irradiation. Furthermore, another objective of the present invention is to provide various photocatalytic reactions such as a decomposition reaction of nitrogen oxides and an isomerization reaction of butenes by irradiating the photocatalysts with ultraviolet to visible light in the presence of nitrogen oxides, butenes and the like.

These objectives of the present invention have been accomplished by a titanium oxide photocatalyst having metal ions of one or more metals incorporated therein selected from the group consisting of Cr, V, Cu, Fe, Mg, Ag, Pd, Ni, Mn and Pt, wherein the metal ions are implanted from the surface to deep inside of the bulk of the photocatalyst in an amount of at least $1\times10^{15}$ ions per g of the titanium oxide.

Furthermore, these objectives of the present invention have been accomplished by a process for producing a photocatalyst, which comprises accelerating metal ions of one or more metals selected from the group consisting of Cr., V, Cu, Fe, Mg, Ag, Pd, Ni, Mn and Pt to an energy level of at least 30 keV and implanting the accelerated metal ions into a titanium oxide.

Moreover, these objectives of the present invention have been a photocatalytic reaction method, which comprises irradiating light in the wavelength regions from ultraviolet to visible on the titanium oxide photocatalyst.

BEST MODE FOR PRACTICING THE INVENTION

Figure 1:
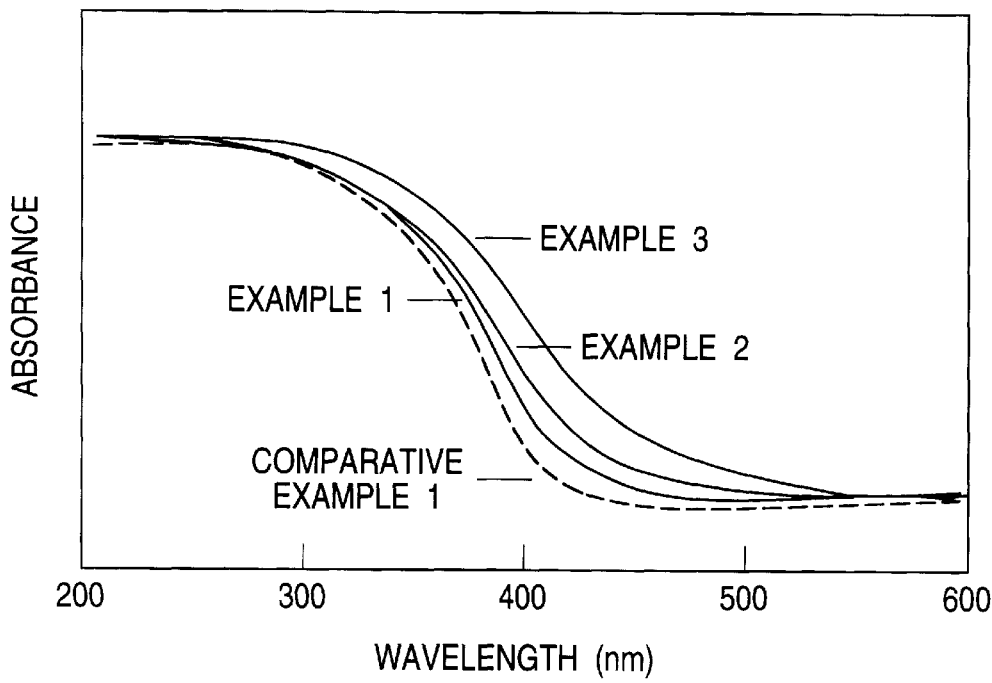
FIG. 1 shows absorption spectra in the ultraviolet and visible light regions of the photocatalysts of the present invention.

Intensive studies were conducted over a long period of time in order to solve the above-described problems. Recently, ion implantation techniques for doping had been used in the field of semiconductors, and we focused our attention on the possibility of applying this advanced technique for the modification of the electronic states of photocatalysts, i.e., the implanting of metal ions into various catalytic materials. Subsequent investigations using titanium oxide catalysts were carried out to observe and monitor the effects of the various implanted metal ions on the photocatalytic properties of the catalysts. Surprisingly, it was discovered that incorporating specific metal ions into the titanium oxide catalysts allowed the catalyst to absorb light not only in the ultraviolet region but also in the visible light regions of about 400 to 800 nm where light absorption by titanium oxide photocatalysts had, until now, been regarded as impossible. Furthermore, irradiation of the metal ion-implanted titanium oxide catalysts by visible light enabled various reactions such as the decomposition reaction of nitrogen oxide and the isomerization reaction of butene at normal temperatures. The present invention has been based on the observations and findings of these extensive aforementioned investigations.

The photocatalysts used in the present invention comprises titanium oxide catalysts having specific metal ions incorporated therein.

The metal ions incorporated into the titanium oxide are metal ions of at least one metal selected from the group consisting of Cr, V, Cu, Fe, Mg, Ag, Pd, Ni, Mn and Pt, preferably Cr, V, Fe, Ni and Mn, and more preferably Cr and V. Although the metal ions are not particularly limited in their charge number, the ions in an accelerated state prior to implantation have a valence of one in most cases. After implantation, the metal ions present in the catalyst have valences of from one to five.

Also, metal ions of one type of metal as well as in combination with another or other metals can be used for implantation.

The metal ions are incorporated into the titanium oxide catalysts in an amount of at least $1\times10^{15}$ ions per g of the titanium oxide, and the unit refers to the number of metal ions per g of the titanium oxide.

It was found that when the number of metal ions falls below $1\times10^{15}$ per g of the titanium oxide, the titanium oxide catalyst loses its ability to absorb light in the visible light region and hence, is no longer able to function as a photocatalyst.

Although there is no specific upper limit on the amount of metal ions incorporated into the titanium oxide catalyst, the number preferably does not exceed $1\times10^{21}$ ions per g of the titanium oxide because there are cases in which photocatalytic reactivity cannot be obtained.

The most effective amount of metal ions incorporated into the titanium oxide catalyst is in the range of $1\times10^{16}$ to $5\times10^{18}$ ions per g of the titanium oxide and more preferably $1\times10^{16}$ to $5\times10^{17}$ ions per g of the titanium oxide, although these numbers may vary depending on the kind of metal ion used.

Although the metal ions incorporated into the titanium oxide catalyst may be present on the surface of the catalyst bulk, most of the metal ions are preferably present within the bulk of the titanium oxide catalyst. Specifically, at least 90%, more preferably at least 95%, and most preferably at least 99% of the metal ions are present within the bulk of the titanium oxide catalyst.

The metal ions incorporated into the bulk of the titanium oxide are preferably implanted within a depth of 1000 Å from the surface, and preferably within a depth of 300 Å from the surface. Furthermore, the metal ions incorporated into the titanium oxide should be uniformly dispersed within the bulk of the catalyst.

Examples of the titanium oxide as the bulk include $TiO_2$ and $SrTiO_3$.

The crystal form of the titanium oxide is not limited and can take any form such as anatase, rutile, or any other crystal form.

Also, although the photocatalyst of the present invention comprises a titanium oxide catalyst into which specific amounts of various metal ions have been incorporated on the surface and/or mainly within the bulk of the catalyst, other photocatalysts may also be used in combination with the present photocatalyst while other materials can also be used in combination with the titanium oxide.

The photocatalysts of the present invention may take any form such as powder, granules, pellets, or film, and is preferably powder.

Furthermore, for the powdered photocatalyst, the average particle diameter is not limited but can be from 1 to 1,000 nm, preferably from 1 to 500 nm, and most preferably from 5 to 50 nm.

The photocatalyst of the present invention may be used as prepared or mixed with a binder to form a mixture that can be applied as a film as well as supported on any substance or material such as paper.

The present invention provides a photocatalyst which is produced by implanting a titanium oxide catalyst with the metal ions of one or more metals selected from the group consisting of Cr, V, Cu, Fe, Mg, Ag, Pd, Ni, Mn and Pt by high voltage acceleration of at least 30 keV.

The energy voltage of the accelerated metal ion implantation should be at least 30 kev, more preferably from 50 to 400 keV, and most preferably from 100 to 200 keV. Such a high energy voltage not only disperses the metal ions within the bulk of the catalyst more uniformly, but also prevents the destructive modification of the catalysts by the metal ions.

The amount of metal ions implanted varies depending on the kind of metal ions used, however, the number should be from $1\times10^{14}$ to $1\times10^{19}$ ions/cm$^2$ and most preferably from $1\times10^{16}$ to $1\times10^{17}$ ions/cm$^2$. The unit refers to the amount of metal ions implanted per cm$^2$ of the implanted area.

The method for doping impurities in the field of semiconductors was applied to implant metal ions to produce the photocatalysts of the present invention. The procedure in which metal ions accelerated by high energy voltage are implanted into the semiconducting catalyst modifies the electronic state of the catalyst. The ion-implantation method is also used to modify the surface properties of metal materials such as steel.

The titanium oxide used as the photocatalyst of the present invention may take any form or structure without any particular limitations, although the powdered form is preferable.

There are no particular limitations on the particle diameter of the oxide used in powder form. However, a particle diameter from 1 to 1000 nm can be used, although a diameter of 1 to 500 nm is preferable, and 1 to 50 nm is most preferable.

The photocatalysts of the present invention are able to absorb light not only in the ultraviolet regions, but also in the visible light regions (about 400 to 800 nm), where light absorption by titanium oxide photocatalysts had until now been regarded as impossible. This invention allows the photocatalysts developed to carry-out efficient photocatalytic reactions under irradiation with both ultraviolet and visible light.

Furthermore, the light used for these photocatalytic reactions can be from ultraviolet to visible, but can also be ultraviolet alone as well as only visible. The reaction systems may also be irradiated with light of a specific selected wavelength in the ultraviolet to visible regions. As long as light from the ultraviolet to visible light region is irradiated, light in other wavelength regions such as far ultraviolet or infrared light may be present.

The most desirable wavelength for photocatalytic reactions to take place with the photocatalysts of the present invention is from 250 to 500 nm.

The irradiation intensity of the ultraviolet to visible light used to initiate photocatalytic reactions with the photocatalysts of the present invention is not limited and may be selected to suit the specific photocatalytic reaction.

The amount of the photocatalysts of the present invention that can be used to initiate reactions is not limited and may be varied to suit the specific photocatalytic reaction system. However, an amount of 0.01 to 10,000 g per mol of the raw material is sufficient.

Examples of photocatalytic reactions of the present invention include the decomposition reaction of nitrogen oxides in which the decomposition is carried out by irradiating the photocatalyst with ultraviolet to visible light in the presence of nitrogen oxides as well as the isomerization reaction of butenes in which the isomerization is carried out by irradiating the photocatalyst with ultraviolet to visible light in the presence of butenes such as the isomerization of cis-2-butene into 1-butene and cis-2-butene into trans-2-butene.

Other examples of photocatalytic reactions of the present invention include the photocatalytic isomerization of alkenes other than the above isomerization of butenes, the photocatalytic hydrogenation and/or hydrogenolysis of alkenes and alkynes to produce ethane and methane from propylene and water, the photocatalytic oxidation of alcohol to produce aldehydes and ketones from 2-propanol, the photocatalytic production of secondary amines from primary amines, the photocatalytic synthesis of amino acids, i.e., the production of glycine and/or alanine from methane, water, and ammonia, as well as photocatalytic gas-shift and reverse gas-shift reactions such as:

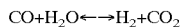

As a clean and inexhaustible source of energy, the conversion and storage of solar light are also vital in the reduction and fixation of carbon dioxide with water to obtain useful organic compounds. Specifically, such photocatalytic reactions include synthesis reactions of methane, methanol and formaldehyde which all use carbon dioxide and water as starting materials. Also, the visible light-induced photodecomposition of water into hydrogen and oxygen can be considered as an ideal example of the effective utilization of solar energy in which the starting materials are themselves limitless and inexpensive, enable energy storage and are nonhazardous to the environment.

The photocatalytic properties of the photocatalyst of the present invention can be applied for a number of purposes.

For example, toxic nitrogen oxides discharged from factories and vehicles which have been found to be extremely harmful to humans and the environment and which are the direct cause of smog and acid rain can be effectively decomposed and removed by applying the photocatalysts of the present invention to such reaction systems. Specifically, the photocatalysts can be applied to outside walls or mixed with paint for buildings, used in surface paint for roads or motor vehicles, or on window glass, and the like to decompose nitrogen oxides into harmless nitrogen and oxygen with sunlight or any other light source such as an electric lamp post.

The photocatalysts of the present invention can also be applied effectively to purify water by decomposing toxic substances such as trihalomethanes present in an aqueous environment.

Photocatalytic reactions in which the photocatalysts of the present invention are applied can be carried out at ordinary temperatures and the reaction temperatures are not limited. However, the reactions can usually be conducted at temperatures of from 0 to 200° C.

Although the specific mechanisms behind the photocatalytic reactions initiated by the photocatalysts of the present invention are yet unclear, because the incorporation of metal ions into the photocatalysts by conventional impregnation, coprecipitation, and alkoxide techniques were not successful in producing titanium oxide photocatalysts able to absorb visible light and exhibit photocatalytic reactivity under visible light irradiation, it can be said that these effects are attributed to the uniformly and highly dispersed state of the metal ions incorporated into the titanium oxide photocatalyst by the high energy ion-implantation method of the present invention. Namely, the incorporation of metal ions in such a highly and uniformly dispersed state by high energy implantation modifies the electronic properties of the photocatalyst, enabling the absorption of visible light. Irradiation with visible light causes the titanium oxide photocatalyst to absorb light and to generate electrons and holes. The electrons migrate to the metal sites present on the surface of the photocatalyst where the catalytic function of the metal enables the reduction reaction to proceed, while the holes initiate an efficient oxidation reaction on the titanium oxide developed in this invention.

Since the photocatalyst of the present invention absorbs light in the visible region, where light absorption by titanium oxide photocatalysts has been regarded as impossible, as well as in the ultraviolet region, various photocatalytic reactions can be accelerated by irradiation with ultraviolet to visible light in the presence of the photocatalyst of the present invention.

The photocatalysts, the process for producing the photocatalysts, and the catalytic reaction methods of the present invention are of great significance.

Examples and Comparative examples have been provided to explain the details of the present invention. However, the present invention should not be construed as being limited to the Examples presented.

In Examples, analysis of the incorporation of the metal ions into the titanium oxide as well as the actual state of the implanted ions was carried out by three-dimensional SIMS (secondary-ion mass spectroscopy) and XPS (X-ray photoelectron spectroscopy).

EXAMPLE 1

V ions accelerated to 150 keV by a 200 keV ion implantation device used in the doping of impurities into semiconductors were implanted into a titanium oxide photocatalyst (P-25, Degussa AG) having an average particle diameter of 21 nm in a dose of $7.5 \times 10^{15}$ ions/cm$^2$.

The dispersion state of the V ions incorporated into the titanium oxide photocatalyst was examined by three-dimensional SIMS and XPS techniques. At least 99% of the V ions incorporated were found to be uniformly dispersed from the surface of the titanium oxide to a depth of 200 Å from the surface in an amount of $7.5 \times 10^{16}$ ions/g-TiO$_2$.

The ultraviolet to visible light absorption spectrum of the photocatalyst comprising the titanium oxide incorporated with V ions was determined as a function of the amount of V ions implanted. The absorption spectrum obtained is shown in FIG. 1.

EXAMPLE 2

A photocatalyst comprising a titanium oxide implanted with V ions was prepared in accordance with procedures described in Example 1, under the following conditions:

Acceleration energy: 150 keV
V ion implantation: $1.5 \times 10^{16}$ ions/cm$^2$.

The dispersion state of the V ions incorporated into the titanium oxide photocatalyst was examined by three-dimensional SIMS and XPS measurements. At least 99% of the V ions were found to exist in a uniformly dispersed state from the surface to a depth of 200 Å in an amount of $1.5 \times 10^{17}$ ions/g-TiO$_2$.

The ultraviolet to visible light absorption spectrum of the photocatalyst comprising the titanium oxide incorporated with V ions was determined. The absorption spectrum obtained is shown in FIG. 1.

EXAMPLE 3

A titanium oxide photocatalyst incorporated with V ions was prepared in accordance with procedures in Example 1, under the following conditions:
Acceleration energy: 150 keV
V ion implantation: $3.0 \times 10^{16}$ ions/cm$^2$.

The dispersion state of the V ions implanted into the titanium oxide photocatalyst by ion implantation was examined by three-dimensional SIMS and XPS investigative techniques. At least 99% of the V ions were found to exist in a uniformly dispersed state from the surface to a depth of 200 Å in an amount of $3.0 \times 10^{17}$ ions/g-TiO$_2$.

The ultraviolet to visible light absorption spectrum of the photocatalyst comprising the titanium oxide incorporated with V ions was determined. The absorption spectrum obtained is shown in FIG. 1.

COMPARATIVE EXAMPLE 1

The ultraviolet to visible light absorption spectrum of the titanium oxide (P-25, Degussa AG) was determined as in Example 1. The absorption spectrum obtained is shown in FIG. 1.

FIG. 1 shows that the unimplanted titanium oxide has a bandgap at about 380 nm, is capable of absorbing light only in the ultraviolet region of about 400 nm or less and cannot absorb light in the visible light region, whereas the titanium oxide incorporated with V ions by ion implantation shows the capacity to absorb light in the visible light region of 400 nm or more.

EXAMPLE 4

A 200 keV ion implantation device used in the doping of impurities into semiconductors was applied for the acceleration and implantation of Cr ions into a titanium oxide (P-25, Degussa AG) having an average particle diameter of 21 nm at 150 keV and in a dose of $1 \times 10^{16}$ ions/cm2.

The dispersion state of the Cr ions incorporated into the titanium oxide photocatalyst was analyzed by three-dimensional SIMS and XPS measurements. At least 99% of the Cr ions were found to exist in a uniformly dispersed state from the surface to a depth of 200 Å from the surface in an amount of $1 \times 10^{17}$ ions/g-TiO$_2$.

Figure 2:
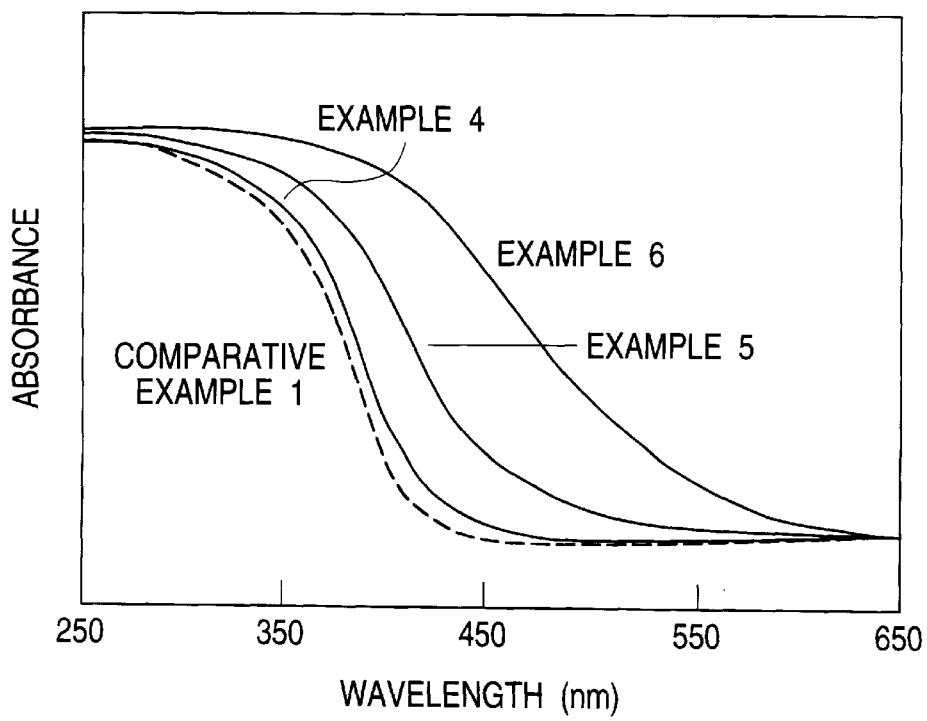
FIG. 2 shows absorption spectra in the ultraviolet and visible light regions of the photocatalysts of the present invention.

The ultraviolet to visible light absorption spectrum of the photocatalyst comprising the titanium oxide incorporated with Cr ions was determined as a function of the amount of Cr ions incorporated. The absorption spectrum obtained is shown in FIG. 2.

EXAMPLE 5

A titanium oxide photocatalyst implanted with Cr ions was prepared in the same manner as described in Example 4, under the following conditions:
Acceleration energy: 150 keV
Cr ion implantation: $1.5 \times 10^{16}$ ions/cm$^2$.

The dispersion state of the Cr ions incorporated into the titanium oxide photocatalyst by ion implantation was examined by three-dimensional SIMS and XPS measurements. At least 99% of the Cr ions were found to exist in a uniformly dispersed state from the surface to a depth of 200 Å from the surface in an amount of $1.5 \times 10^{17}$ ions/g-TiO$_2$.

The ultraviolet to visible light absorption spectrum of the photocatalyst comprising the titanium oxide incorporated with Cr ions was determined. The absorption spectrum obtained is shown in FIG. 2.

EXAMPLE 6

A titanium oxide photocatalyst implanted with Cr ions was prepared in the same manner as described in Example 4, under the following conditions:
Acceleration energy: 150 kev
Cr ion implantation: $12 \times 10^{16}$ ions/cm$^2$.

The dispersion state of the Cr ions incorporated into the titanium oxide photocatalyst by ion implantation was examined by three-dimensional SIMS and XPS investigations. At least 99% of the Cr ions were found to exist in a uniformly dispersed state from the surface to a depth of 200 Å from the surface in an amount of $12 \times 10^{17}$ ions/g-TiO$_2$.

The ultraviolet to visible light absorption spectrum of the photocatalyst comprising the titanium oxide incorporated with Cr ions was determined. The absorption spectrum obtained is shown in FIG. 2.

FIG. 2 shows that, as with the results of Comparative Example 1, the unimplanted titanium oxide sample has a bandgap value of about 380 nm, is capable of absorbing light only in the ultraviolet regions of about 400 nm or less, and cannot absorb light in the visible light region, whereas the titanium oxide samples incorporated with Cr ions by ion implantation are able to absorb light in the visible light region of 400 nm or more. These results clearly demonstrate that the titanium oxide photocatalysts incorporated with specific metal ions showed the capacity to absorb visible light not only with ultraviolet but also visible light irradiation which had been regarded as impossible for titanium oxide photocatalysts until the present invention.

EXAMPLE 7

Fe ions accelerated to 150 keV by a 200 keV ion implantation device used in the doping of impurities into semiconductors were implanted into a titanium oxide photocatalyst (P-25, Degussa AG) having an average particle diameter of 21 nm, in a dose of $7.5 \times 10^{15}$ ions/cm$^2$.

The dispersion state of the Fe ions incorporated into the titanium oxide photocatalyst was examined by three-dimensional SIMS and XPS techniques. At least 99% of the Fe ions incorporated were found to be uniformly dispersed from the surface of the titanium oxide to a depth of 200 Å in an amount of $7.5 \times 10^{16}$ ions/g-TiO$_2$.

EXAMPLE 8

A photocatalyst comprising a titanium oxide implanted with Fe ions was prepared in the same manner as described in Example 7, under the following conditions:
Acceleration energy: 150 keV
Fe ion implantation: $1.5 \times 10^{16}$ ions/cm$^2$.

The dispersion state of the Fe ions incorporated into the titanium oxide photocatalyst was examined by three-dimensional SIMS and XPS investigative techniques. At least 99% of the Fe ions were found to exist in a uniformly dispersed state from the surface of the titanium oxide to a depth of 200 Å in an amount of $1.5 \times 10^{17}$ ions/g-TiO$_2$.

EXAMPLE 9

A titanium oxide photocatalyst incorporated with Fe ions was prepared in the same manner as described in Example 7, under the following conditions:
Acceleration energy: 150 keV
Fe ion implantation: $3.0 \times 10^{16}$ ions/cm$^2$.

The dispersion state of the Fe ions incorporated into the titanium oxide photocatalyst by ion implantation was examined by three-dimensional SIMS and XPS investigations. At least 99% of the Fe ions were found to exist in a uniformly dispersed state from the surface of the titanium oxide to a depth of 200 Å in an amount of $3.0 \times 10^{17}$ ions/g-TiO$_2$.

EXAMPLE 10

Fe ions accelerated to 150 keV by a 200 keV ion implantation device used in the doping of impurities into semiconductors were implanted into a titanium oxide photocatalyst (P-25, Degussa AG) having an average particle diameter of 21 nm in a dose of $2.2 \times 10^{15}$ ions/cm$^2$.

The dispersion state of the Fe ions incorporated into the titanium oxide photocatalyst was examined by three-dimensional SIMS and XPS investigations. At least 99% of the Fe ions incorporated were found to exist in a uniformly dispersed state from the surface of the titanium oxide to a depth of 200 Å from the surface in an amount of $2.2 \times 10^{16}$ ions/g-TiO$_2$.

Figure 3:
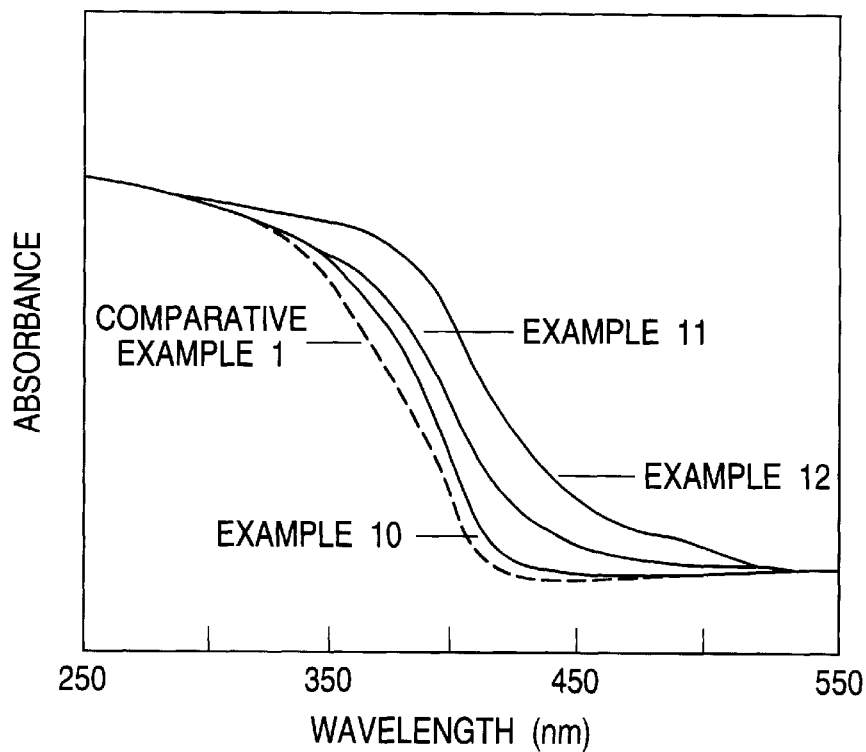
FIG. 3 shows absorption spectra in the ultraviolet and visible light regions of the photocatalysts of the present invention.

The ultraviolet to visible light absorption spectrum of the photocatalyst comprising the titanium oxide incorporated with Fe ions was determined as a function of the amount of Fe ions implanted. The absorption spectrum obtained is shown in FIG. 3.

EXAMPLE 11

A photocatalyst comprising a titanium oxide incorporated with Fe ions by ion implantation was prepared in the same manner as described in Example 10, under the following conditions:
Acceleration energy: 150 keV
Fe ion implantation: $6.6 \times 10^{15}$ ions/cm$^2$.

The dispersion state of the Fe ions incorporated into the titanium oxide photocatalyst was examined by three-dimensional SIMS and XPS investigations. At least 99% of the Fe ions were found to exist in a uniformly dispersed state from the surface of the titanium oxide to a depth of 200 Å in an amount of $6.6 \times 10^{16}$ ions/g-TiO$_2$.

The ultraviolet to visible light absorption spectrum of the photocatalyst comprising the titanium oxide incorporated with Fe ions was determined. The absorption spectrum obtained is shown in FIG. 3.

EXAMPLE 12

A photocatalyst comprising a titanium oxide implanted with Fe ions was prepared in the same manner as described in Example 10, under the following conditions:
Acceleration energy: 150 keV
Fe ion implantation: $1.3 \times 10^{16}$ ions/cm$^2$.

The dispersion state of the Fe ions incorporated into the titanium oxide photocatalyst by ion implantation was examined by three-dimensional SIMS and XPS investigations. At least 99% of the Fe ions were found to exist in a uniformly dispersed state from the surface of the titanium oxide to a depth of 200 Å in an amount of $1.3 \times 10^{17}$ ions/g-TiO$_2$.

The ultraviolet to visible light absorption spectrum of the photocatalyst comprising the titanium oxide incorporated with Fe ions was determined. The absorption spectrum obtained is shown in FIG. 3.

FIG. 3 shows that the unimplanted titanium oxide has a bandgap of about 380 nm, is capable of absorbing light only in the ultraviolet region of about 400 nm or less, and cannot absorb light in the visible region, whereas the titanium oxide incorporated with Fe ions by ion implantation shows the capacity to absorb light in the visible light region of 400 nm or more.

EXAMPLE 13

Ni ions accelerated to 150 keV by a 200 keV ion implantation device used in the doping of impurities into semiconductors, were implanted into a titanium oxide photocatalyst (P-25, Degussa AG) having an average particle diameter of 21 nm in a dose of $2.2 \times 10^{15}$ ions/cm$^2$.

The dispersion state of the Ni ions incorporated into the titanium oxide photocatalyst was examined by three-dimensional SIMS and XPS measurements. At least 99% of the Ni ions implanted were found to exist in a uniformly dispersed state from the surface of the titanium oxide to a depth of 200 Å in an amount of $2.2 \times 10^{16}$ ions/g-TiO$_2$.

Figure 4:
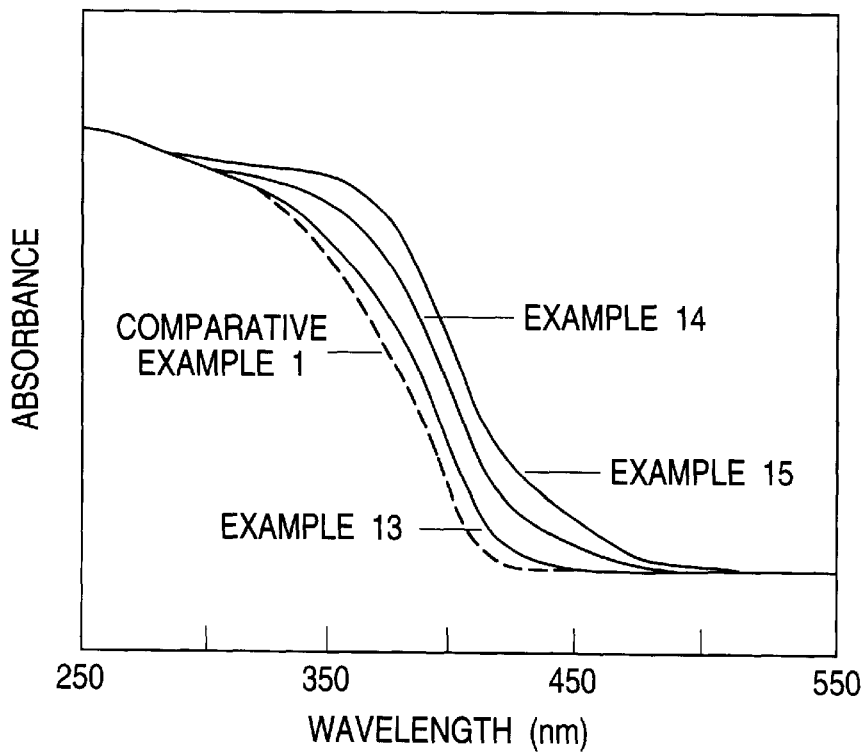
FIG. 4 shows absorption spectra in the ultraviolet and visible light regions of the photocatalysts of the present invention.

The ultraviolet to visible light absorption spectrum of the photocatalyst comprising the titanium oxide incorporated with Ni ions was determined as a function of the amount of Ni ions implanted. The absorption spectrum obtained is shown in FIG. 4.

EXAMPLE 14

A titanium oxide photocatalyst implanted with Ni ions was prepared in accordance with procedures described in Example 13, under the following experimentation conditions:
Acceleration energy: 150 keV
Ni ion implantation: $6.6 \times 10^{15}$ ions/cm$^2$.

The dispersion state of the Ni ions incorporated into the titanium oxide photocatalyst was examined by three-dimensional SIMS and XPS investigations. At least 99% of the Ni ions were found to exist in a uniformly dispersed state from the surface of the titanium oxide to a depth of 200 Å in an amount of $6.6 \times 10^{16}$ ions/g-TiO$_2$.

The ultraviolet to visible light absorption spectrum of the photocatalyst comprising the titanium oxide incorporated with Ni ions was determined. The absorption spectrum obtained is shown in FIG. 4.

EXAMPLE 15

A titanium oxide photocatalyst implanted with Ni ions was prepared in accordance with procedures described in Example 4, under the following conditions:
Acceleration energy: 150 keV
Ni ion implantation: $1.3 \times 10^{16}$ ions/cm$^2$.

The dispersion state of the Ni ions incorporated into the titanium oxide photocatalyst was examined by three-dimensional SIMS and XPS measurements. At least 99% of the Ni ions were found to exist in a uniformly dispersed state from the surface of the titanium oxide to a depth of 200 Å in an amount of $1.3 \times 10^{17}$ ions/g-TiO$_2$.

The ultraviolet to visible light absorption spectrum of the photocatalyst comprising the titanium oxide incorporated with Ni ions was determined. The absorption spectrum obtained is shown in FIG. 4.

FIG. 4 shows that, as with the results of Comparative Example 1, the unimplanted titanium oxide has a bandgap of about 380 nm, is capable of absorbing light only in the ultraviolet region of about 400 nm or less, and cannot absorb light in the visible region, whereas the titanium oxide incorporated with Ni ions by ion implantation is able to absorb light in the visible light region of 400 nm or more. These results clearly demonstrate that the titanium oxide photocatalysts incorporated with specific metal ions showed the capacity to absorb visible light not only with ultraviolet but also visible light irradiation which had been regarded as impossible for titanium oxide photocatalysts until the present invention.

EXAMPLE 16

Mn ions accelerated to 150 keV by a 200 KeV ion implantation device used for the doping of impurities into semiconductors, were implanted into a titanium oxide photocatalyst (P-25, Degussa AG) having an average particle diameter of 21 nm in a dose of $1\times10^{15}$ ions/cm$^2$.

The dispersion state of the Mn ions incorporated into the titanium oxide was examined by three-dimensional SIMS and XPS measurements. At least 99% of the Mn ions implanted were found to exist in a uniformly dispersed state from the surface of the titanium oxide to a depth of 200 Å in an amount of $1\times10^{16}$ ions/g-TiO$_2$.

Figure 5:
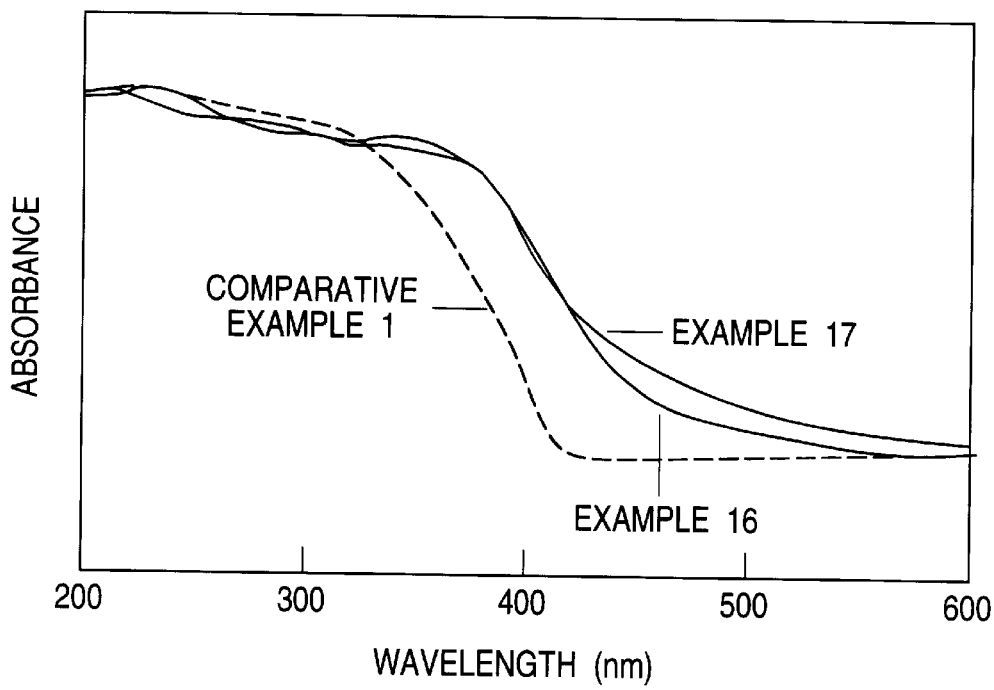
FIG. 5 shows absorption spectra in the ultraviolet and visible light regions of the photocatalysts of the present invention.

The ultraviolet to visible light absorption spectrum of the photocatalyst comprising the titanium oxide incorporated with Mn ions was determined as a function of the amount of Mn ions implanted. The absorption spectrum obtained is shown in FIG. 5.

EXAMPLE 17

A titanium oxide photocatalyst implanted with Mn ions was prepared in the same manner as described in Example 16, under the following conditions:
Acceleration energy: 150 keV
Mn ion implantation: $3\times10^{15}$ ions/cm$^2$.

The dispersion state of the Mn ions incorporated into the titanium oxide was examined by three-dimensional SIMS and XPS investigations. At least 99% of the Mn ions were found to exist in a uniformly dispersed state from the surface of the titanium oxide to a depth of 200 Å in an amount of $3\times10^{16}$ ions/g-TiO$_2$.

The ultraviolet to visible light absorption spectrum of the photocatalyst comprising the titanium oxide incorporated with Mn ions was determined. The absorption spectrum obtained is shown in FIG. 5.

FIG. 5 shows that, as with the results of Comparative Example 1, the unimplanted titanium oxide has a bandgap of about 380 nm, is capable of absorbing light only in the ultraviolet region of about 400 nm or less, and cannot absorb light in the visible region, whereas the titanium oxide incorporated with Mn ions by ion implantation is able to absorb light in the visible light region of 400 nm or more. These results clearly demonstrate that the titanium oxide photocatalysts incorporated with specific metal ions showed the capacity to absorb visible light not only with ultraviolet but also visible light irradiation which had been regarded as impossible for titanium oxide photocatalysts until the present invention.

EXAMPLE 18
Isomerization Reaction of Butene 250 mg of a titanium oxide photocatalyst implanted with Cr ions in accordance with the procedures described in Example 4 was spread onto the flat bottom of a 50 ml Pyrex glass container.

Figure 6:
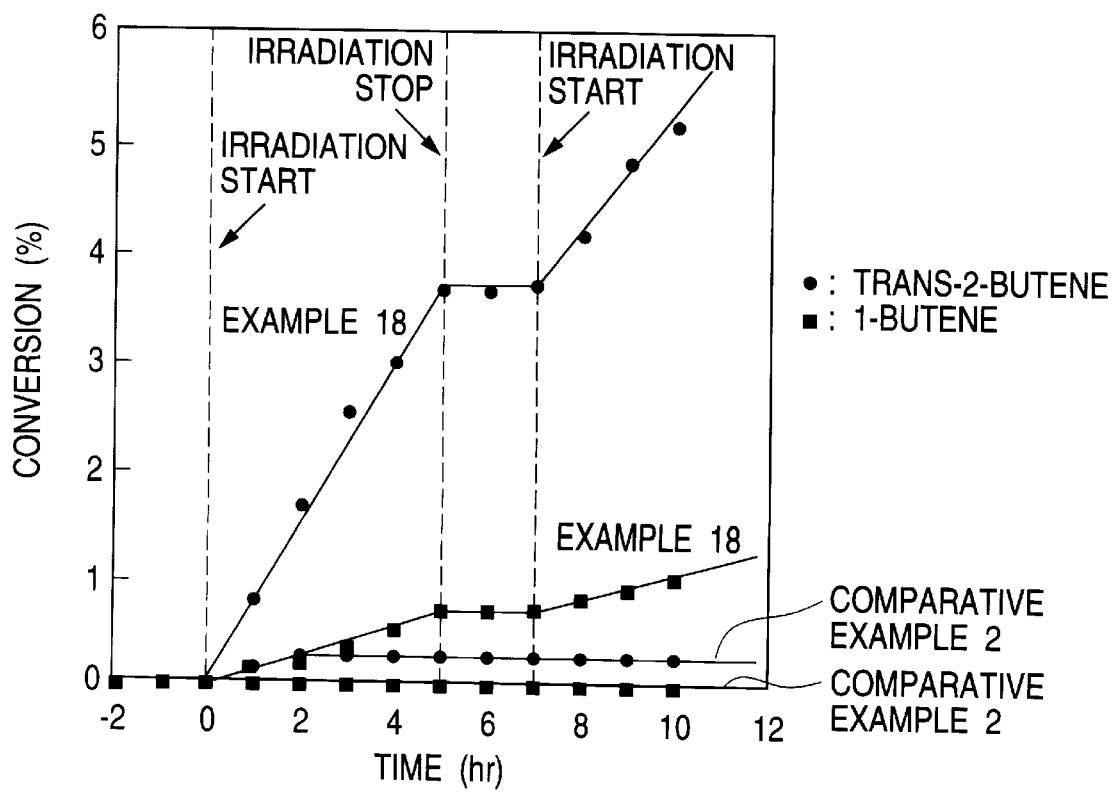
FIG. 6 shows reaction time profiles showing the yields of the photocatalytic isomerization of butene to produce 1-butene and trans-2-butene on the photocatalysts of the present invention.

After pretreatment of the catalyst in vacuum, the reactant molecules, cis-2-butene was introduced onto the catalyst at a pressure of 20 Torr. The photocatalytic isomerization reaction was carried out by irradiation of the catalyst by visible light having wavelengths of 450 nm or less which were controlled by color filters and a mercury lamp having a light intensity of 2,000 μW/cm$^2$ at room temperature in the presence of cis-2-butene. Under visible light irradiation, reaction product samples were collected at defined time intervals and the product molecules, 1-butene and trans-2-butene as well as their yields were analyzed by gas chromatography. FIG. 6 shows the results.

COMPARATIVE EXAMPLE 2

The isomerization reaction of cis-2-butene was carried out in accordance with procedures described in Example 18, except that in place of the titanium oxide photocatalyst implanted with Cr ions, the unimplanted titanium oxide used in Comparative Example 1 was employed and the combined results are shown in FIG. 6.

As clearly seen in FIG. 6, under irradiation with visible light in the wavelength regions of about 450 nm or more, the capacity to initiate an isomerization reaction was negligible for the unimplanted titanium oxide sample. However, with the titanium oxide developed in this invention in which Cr ions are incorporated by ion implantation, the photoisomerization reaction of cis-2-butene into 1-butene and trans-2-butene proceeded efficiently even at room temperature under visible light irradiation.

EXAMPLE 19
Decomposition Reaction of Nitrogen Monoxide (NO)

250 mg of a titanium oxide photocatalyst implanted with Cr ions which had been prepared in accordance with the procedures described in Example 4 was introduced into a reaction cell made of pyrex glass.

Figure 7:
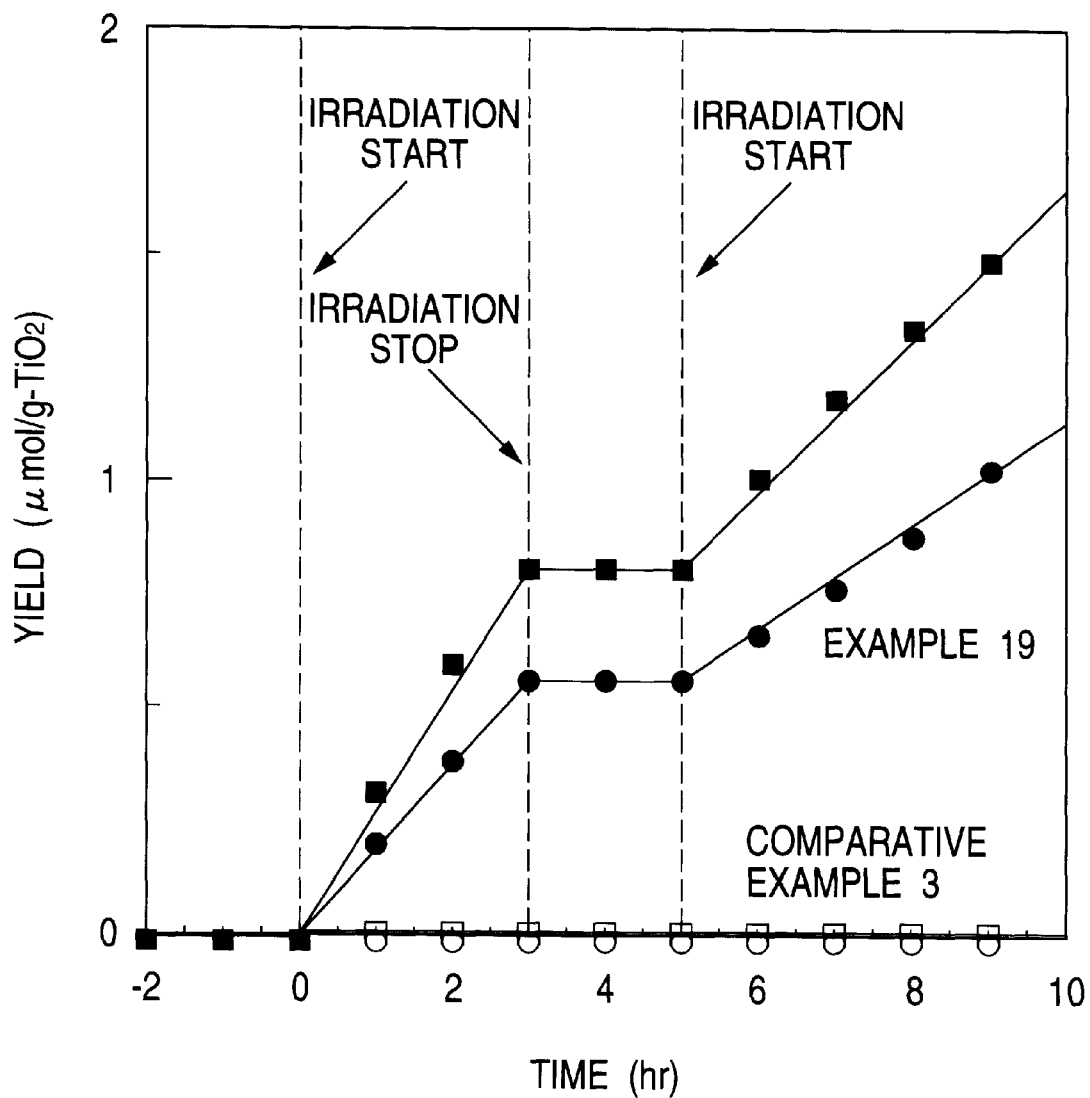
FIG. 7 shows reaction time profiles showing the yields of the photocatalytic decomposition of nitrogen monoxide into $N_2,O_2$ and $N_2O$ on the photocatalyts of the present invention.

After pretreatment in vacuum, NO molecules were introduced onto the catalyst at a pressure of 20 Torr. The photocatalytic decomposition of these NO molecules was carried out by irradiation of the catalyst with visible light having wavelengths 450 nm or less which were controlled by color filters and a mercury lamp having a light intensity of 2,000 μW/cm$^2$ at room temperature in the presence of NO molecules. Under visible light irradiation, samples of the reaction products were collected at defined time intervals and the product molecules, N$_2$, O$_2$, and N$_2$O, as well as their yields were analyzed by gas chromatography. It was found that the yields of N$_2$, O$_2$, and N$_2$O increased while the amount of NO molecules decreased linearly with the visible light irradiation time. FIG. 7 shows the results.

COMPARATIVE EXAMPLE 3

The decomposition of nitrogen monoxide was carried out in accordance with the procedures described in Example 19, except that in place of the titanium oxide photocatalyst implanted with Cr ions, the unimplanted titanium oxide used in Comparative Example 1 was employed. The combined results are shown in FIG. 7.

As can be seen in FIG. 7, under irradiation with visible light in the wavelength regions of about 450 nm or more, the decomposition reaction of nitrogen monoxide could not proceed with the unimplanted titanium oxide. However, with the titanium oxide developed in this invention in which Cr ions are incorporated into the photocatalyst by ion implantation, the decomposition of nitrogen monoxide proceeded efficiently even at room temperature and under visible light irradiation.

EXAMPLE 20
Isomerization Reaction of Butene 250 mg of a titanium oxide photocatalyst implanted with V ions in accordance with the procedures described in Example 4 was spread onto a flat bottom of a 50 ml Pyrex glass container.

Figure 8:
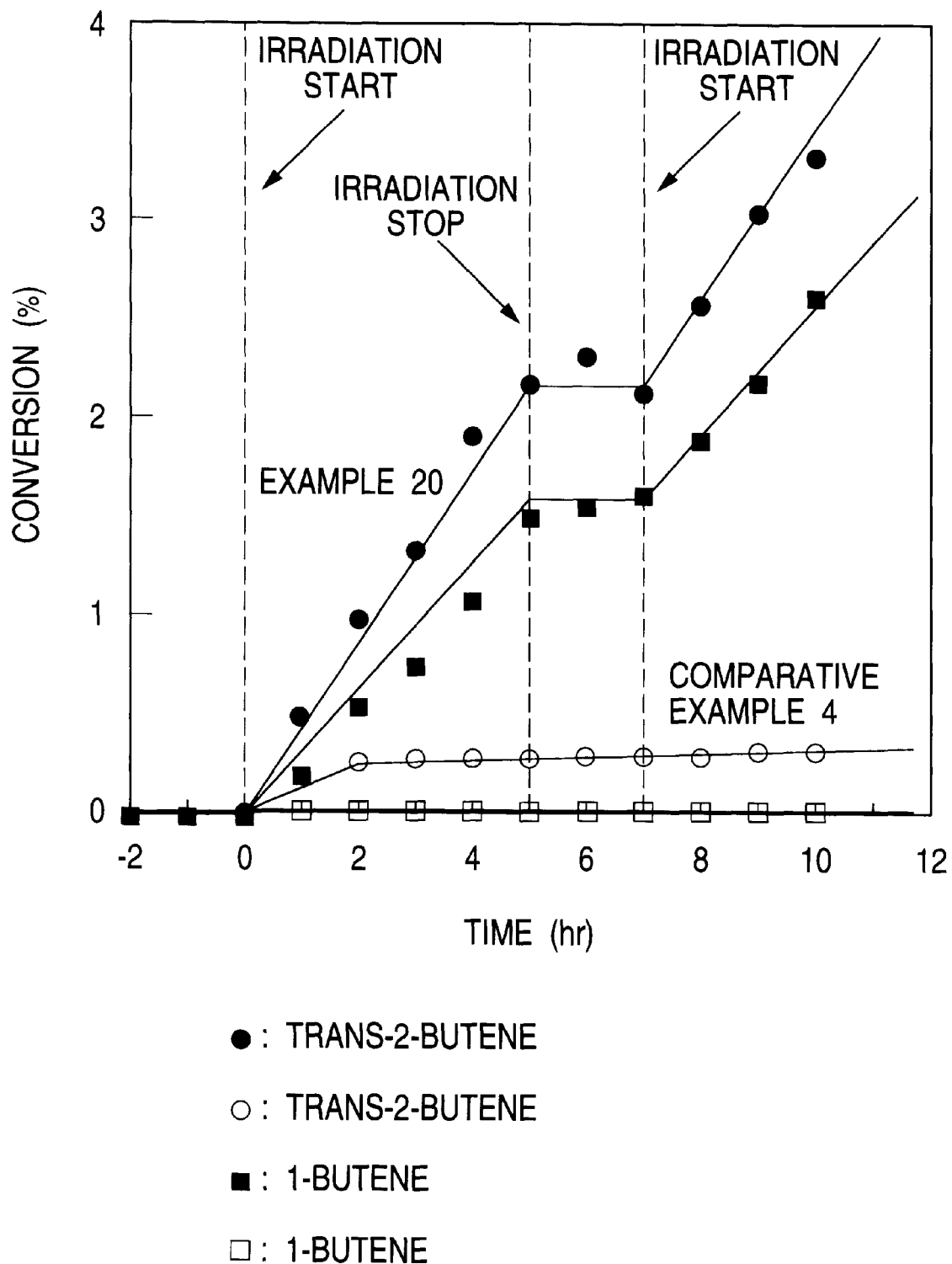
FIG. 8 shows reaction time profiles showing the yields of the photocatalytic isomerization of butene to produce 1-butene and trans-2-butene on the photocatalyst of the present invention.

After pretreatment of the catalyst in vacuum, the reactant molecules, cis-2-butene was introduced onto the catalyst at a pressure of 20 Torr. The photocatalytic isomerization reaction was carried out by irradiation of the catalyst by visible light having wavelengths 450 nm or less which were controlled by color filters and a mercury lamp having a light intensity of 2,000 $\mu W/cm^2$ at room temperature in the presence of cis-2-butene. Under visible light irradiation, samples of the reaction products were collected at defined time intervals and the product molecules, 1-butene and trans-2-butene as well as their yields were analyzed by gas chromatography. FIG. 8 shows the results.

COMPARATIVE EXAMPLE 4

The isomerization reaction of cis-2-butene was carried out in accordance with procedures described in Example 20, except that in place of the titanium oxide photocatalyst implanted with V ions, the unimplanted titanium oxide used in Comparative Example 1 was employed and the combined results are shown in FIG. 8.

As can be clearly seen in FIG. 8, under irradiation with visible light in the wavelength regions of about 450 nm or more, the isomerization reaction could not proceed for the unimplanted titanium oxide catalyst. However, with the titanium oxide photocatalyst developed in this invention in which V ions are incorporated onto the catalyst, the photoisomerization reaction of cis-2-butene into 1-butene and trans-2-butene proceeded efficiently even at room temperature and under visible light irradiation.

EXAMPLE 21

Decomposition Reaction of Nitrogen Monoxide 250 mg of a titanium oxide photocatalyst implanted with V ions prepared in accordance with the procedures described in Example 1 was introduced into a reaction cell made of pyrex glass.

Figure 9:
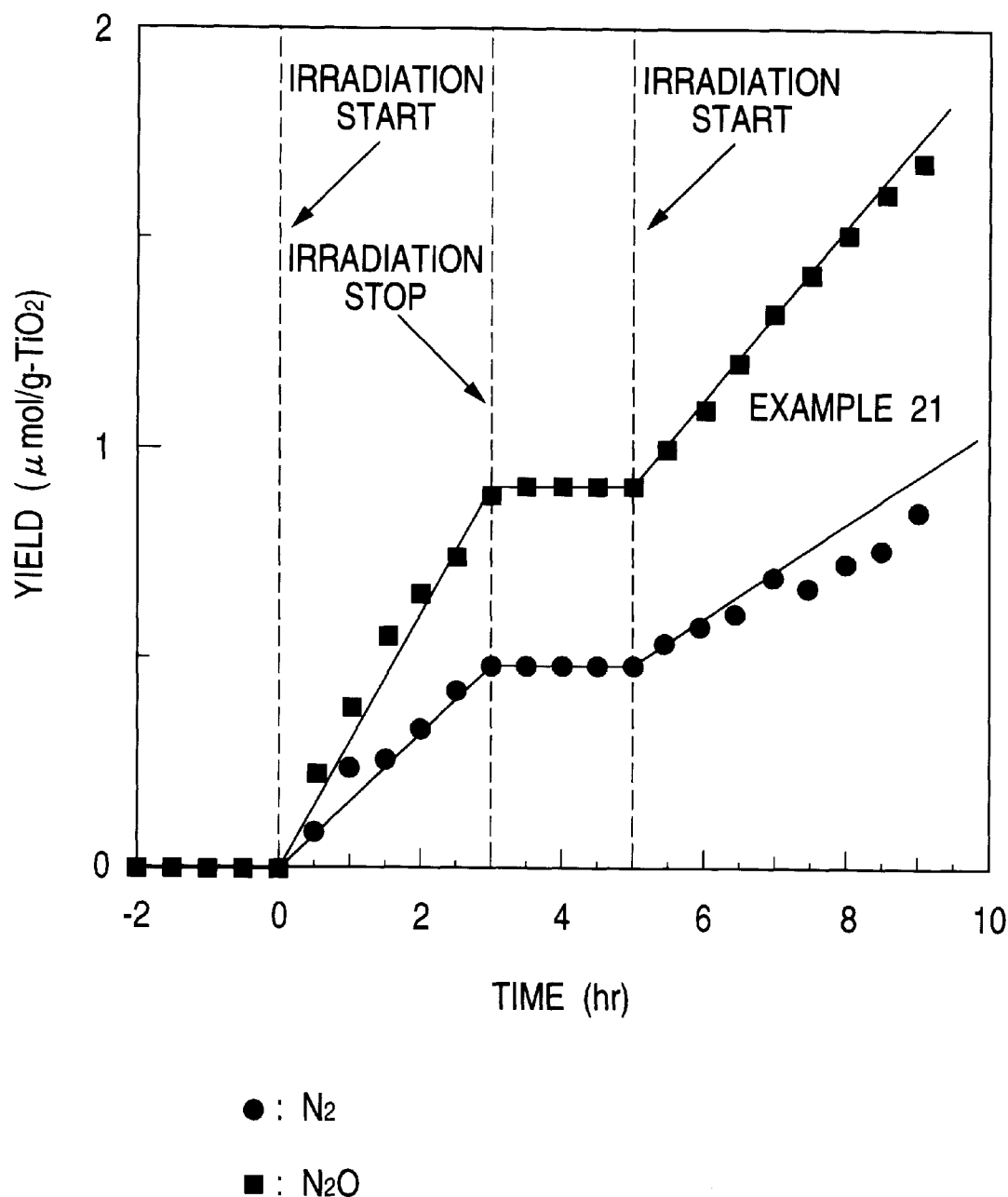
FIG. 9 shows reaction time profiles showing the yields of the photocatalytic decomposition of nitrogen monoxide into $N_2$ and $N_2O$ on the photocatalysts of the present invention.

After pretreatment in vacuum, NO molecules were introduced onto the catalyst at a pressure of 20 Torr. The photocatalytic decomposition of NO molecules was carried out byirradiation of the catalyst by visible light having wavelengths 450 nm or less which were controlled by color filters and a mercury lamp having a light intensity of 2,000 $\mu W/cm^2$ at room temperature in the presence of NO molecules. Under visible light irradiation, samples of the reaction products were collected at defined time intervals and the product molecules, $N_2$ and $N_2O$, as well as their yields were analyzed by gas chromatography. It was found that the amount of NO molecules decreased linearly with visible light irradiation time. FIG. 9 shows the results.

INDUSTRIAL APPLICABILITY

Since the photocatalyst of the present invention absorbs light in the visible region, where light absorption by titanium oxide photocatalyst has been regarded as impossible, as well as in the ultraviolet region, various photocatalytic reactions can be accelerated by irradiation with ultraviolet to visible light in the presence of the photocatalyst of the present invention.

The photocatalysts, the process for producing the photocatalysts, and the catalytic reaction methods of the present invention are of great significance.

What is claimed is:

1. A titanium oxide phototocatalyst having metal ions of one or more metals incorporated therein selected from the group consisting of Cr, V, Cu, Fe, Mg, Ag, Pd, Ni, Mn and Pt, wherein the metals ions are implanted from the surface to deep inside of the bulk of the photocatalyst in an amount of at least $1\times10^{15}$ ions per g of the titanium oxide, wherein the metal ions are present in the titanium oxide from the surface to a depth of 1000 Å.

2. The photocatalyst as claimed in claim 1, wherein the metal ions are of one or more metals selected from the group consisting of Cr, V, Fe, Ni and Mn.

3. The photocatalysts as claimed in claim 1, wherein the titanium oxide is selected from the group consisting of $TiO_2$ and $SrTiO_3$.

4. The photocatalyst as claimed in claim 1, wherein prior to implantation, the metal ions have a valence of one.

5. The photocatalyst as claimed in claim 1, wherein the metal ions are one or more metals selected from the group consisting of Cr, V, Cu, Mg, Ag, Pd, Ni, Mn, and Pt.

6. The photocatalyst as claimed in claim 1, wherein the metal ions are one or more metals selected from the group consisting of Cr, V, Ni, and Mn.

7. The photocatalyst as claimed in claim 1, wherein the metal ions are one or more metals selected from the group consisting of Cr and V.

8. A process for producing a photocatalyst, which comprises accelerating metal ions of one or more metals selected from the group consisting of Cr, V, Cu, Fe, Mg, Ag, Pd, Ni, Mn and Pt to an energy level of at least 30 keV and implanting the accelerated metal ions into a titanium oxide.

9. The process as claimed in claim 8, wherein the metal ions are of one or more metals selected from the group consisting of Cr, V, Fe, Ni and Mn.

10. The process as claimed in claim 8, wherein the titanium oxide is selected from the group consisting of $TiO_2$ and $SrTiO_3$.

11. The process as claimed in claim 8, wherein the metal ions are implanted into the titanium oxide catalyst from the surface to a depth of 1,000 Å.

12. The process as claimed in claim 8, wherein the metal ions are implanted into the titanium oxide catalyst in a dose of from $1\times10^{14}$ to $1\times10^{19}$ ions/$cm^2$.

13. A photocatalytic reaction method, which comprises irradiating light in the wavelength regions from ultraviolet to visible on a titanium oxide photocatalyst having metal ions of one or more metals incorporated therein selected from the group consisting of Cr, V, Cu, Fe, Mg, Ag, Pd, Ni, Mn and Pt, wherein the metals ions are implanted from the surface to deep inside of the bulk of the photocatalyst in an amount of at least $1\times10^{15}$ ions per g of the titanium oxide, wherein the metal ions are present in the titanium oxide from the surface to a depth of 1,000 Å.

14. The method as claimed in claim 13, wherein light in the wavelength regions from ultraviolet to visible is irradiated on the titanium oxide photocatalyst in the presence of nitrogen oxides to decompose the nitrogen oxides.

15. The method as claimed in claim 13, wherein light in the wavelength regions from ultraviolet to visible is irradiated on the titanium oxide photocatalyst in the presence of butenes to isomerize the butenes.

16. The method as claimed in claim 13, wherein the metal ions are of one or more metals selected from the group consisting of Cr, V, Fe, Ni and Mn.

17. The method as claimed in claim 13, wherein the titanium oxide is selected from the group consisting of $TiO_2$ and $SrTiO_3$.

18. The photocatalytic reaction method as claimed in claim 13, wherein prior to implantation, the metal ions have a valence of one.

* * * * *